D. H. TIERNEY.
LATHE-CHUCK.
No. 177,031. Patented May 2, 1876.
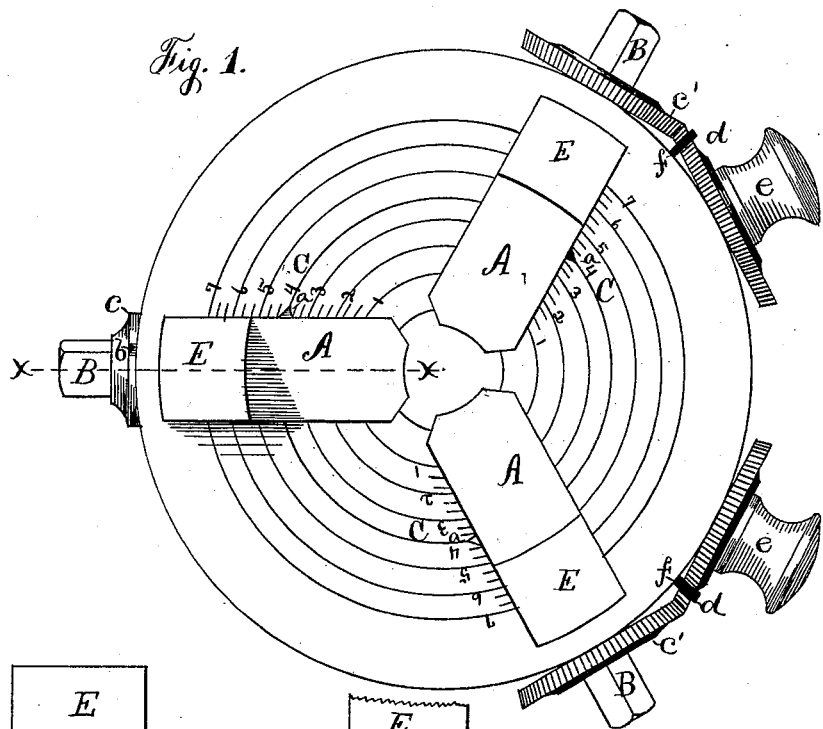
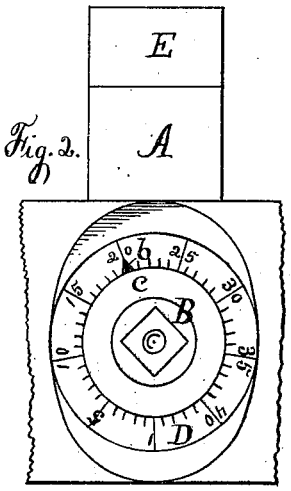
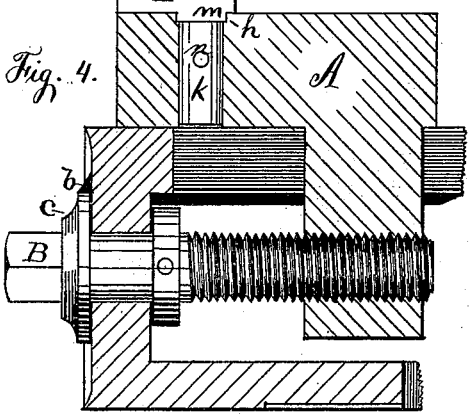
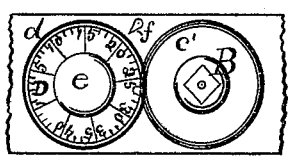
Witnesses
Geo. A. Gowdy
H. N. Gale
Inventor
Dennis H. Tierney.
By James Shepard
Atty.

UNITED STATES PATENT OFFICE.

DENNIS H. TIERNEY, OF FORESTVILLE, CONNECTICUT.

IMPROVEMENT IN LATHE-CHUCKS.

Specification forming part of Letters Patent No. 177,031, dated May 2, 1876; application filed January 21, 1876.

*To all whom it may concern:*

Be it known that I, DENNIS H. TIERNEY, of Forestville, in the county of Hartford and State of Connecticut, have invented certain new and useful Improvements in Lathe-Chucks, of which the following is a specification:

My invention consists, mainly, in the application of certain devices to a lathe-chuck, to indicate the position of the jaws, which devices consist of a pointer on the jaw, projecting laterally therefrom, and which moves over graduation-marks on the face of the chuck; also, an index or indicator upon the screw which operates the jaws; also, an adjusting device for resetting the screw-indicator to compensate for wear; also, of a device for locking the screws and jaws.

In the accompanying drawing, Figure 1 is a face view of a lathe-chuck, which embodies my invention; Fig. 2, a detached elevation, showing the outer end of one screw and jaw. Fig. 3 is a like view, showing one of the screws and its locking mechanism, and Fig. 4 is a sectional view on line $xx$ of Fig. 1.

I provide the chuck with three or more jaws, A A A, each of which are forced out and in by an independent screw, B, substantially the same as in lathe-chucks now in common use. Upon the face of the chuck and contiguous to each jaw B, I form a series of graduation-marks, C, and upon each of the jaws A I provide a pointer or index, $a$, which moves with the jaws and passes over said series of graduation-marks, thereby indicating the position of the jaws. The pointer $a$ is so placed on the jaws A that when they are all on the same graduation-mark—as, for instance, on mark 4—the inner ends of the jaws will all be the same distance from the center of the chuck. Upon the outer end of the screws B at the edge of the chuck, I form an indicator or index, $b$, surrounding which there is a series of graduation-marks, D, and numbers, whereby each revolution of the screw or fractional part thereof is correctly indicated. The indicator $b$ is for a more delicate adjustment than can be made by the indicator $a$, but in a measure both are used conjointly and should be so set as to correspond—for instance, suppose the jaws are to be set with the indicator $a$ on mark 4. Said indicator is first observed until near that point, and then the indicator $b$ is observed and set at mark 20, when, if properly adjusted, the indicator $a$ will be exactly central with mark 4.

The reason that the indicator $b$ gives a finer or more delicate adjustment than indicator $a$ is, that it moves over a far greater surface, and therefore a movement of the jaw A and indicator $a$ that would be almost imperceptible would be clearly indicated by several degrees upon the screw-indicator $b$. In order to compensate for the wear of the parts, I construct the indcator $b$ so that it may be moved on the screw and thereby correctly indicate the position of the jaws. Any construction that will allow its position on the screw to be changed when desired, will answer the purposes of this part of my invention. I form the indicator $b$ on a collar, $c$, which is driven on the screw just tight enough to hold it from slipping out of place by accident, but loosely enough so that it can be driven around and set with all the screw-indicators $b$ upon the same number when the jaws are all central.

These graduated scales and indicators inform the operator of the position of the jaws relatively to each other and to the center of the chuck.

For some uses I desire to attach a stop, so that the jaws may all be held or locked in a desired position beyond any liability to be accidentally moved. In such case I form teeth in the edge of the screw-collar $c$, thereby forming the same into a spur-gear, $c'$. Meshing into this gear $c'$ is a similar gear, $d$, revolving upon a screw-stud, $e$. Upon one or both of the gears $c'$ $d$ I form a series of graduation-marks, D, and in the edge of the chuck I place a pin, $f$, which answers for an indicator. These marks D and indicator $f$ perform precisely the same function, and in the same manner, as the marks D and indicator $b$ hereinbefore described, the only difference being that the marks rotate and the indicator is stationary.

It will also be noticed that the result is the same, whether the marks D are on the gear $c'$ or gear $d$, or both, and the indicator $f$ may be placed at the edge of either gear or both, as may be desired. When the jaws have been set in any desired position, and it is desired to lock them in place, the screw-stud $e$ is turned inward, forcing its shoulder against the gear d, and preventing it from rotating, whereby any endwise pressure upon the jaws will not be liable to move them in the least.

In ordinary lathe-chucks two sets of jaws are formed from a solid piece of metal by the peculiar shape of the jaw, the ends of which form the smaller or inner jaws, and a step on said jaws forms the outer jaws for griping larger articles. The outer and inner jaws are used entirely independent of each other—that is, only one set can be used at once—and when the inner ones are in use the outer ones project so far as to oftentimes seriously interfere with the convenient use of the chuck. To avoid this inconvenence I make the outer jaws detachable.

Various means can be employed for this purpose; but perhaps the best mode of applying the principle of this part of my invention is as follows, viz: In the outer end of the jaw I form a transverse groove, $h$, in the bottom of which I bore a hole, in which hole I fit the shank $k$ of the outer jaw E. At the junction of the shank $k$ and jaw E there is a transverse bar, $m$, which fits in the groove $h$, thereby preventing the jaw from twisting. A small pin, $n$, is then put through the shank $k$ and body of the main jaw A, which prevents the outer jaws E from slipping out of place.

When thus secured the outer jaws are used the same as the outer jaws of ordinary lathe-chucks; but when the inner jaws are to be used the pin $n$ and the outer jaws E are removed so that no part of the chuck projects outward beyond the face of the inner jaws, whereby the tool-rest and other tools can be brought into the most convenient positions for use.

I am aware that prior to my invention graduation marks and figures have been placed upon the face of the chuck, and a mark upon one side of the jaw; but so far as I know a pointer, which projects laterally to one side of the jaws, as shown, has never been used in lathe-chucks, the advantage of the latter over the former being that both the pointer and graduation-marks can be readily observed when looking directly upon the face, whereas in the former both could not be observed, except when looked at in an oblique direction, and then only when viewed upon a particular side of the jaw.

I claim as my invention—

1. In a lathe-chuck two or more independent holding-jaws, two or more independent screws, each provided with an indicator, $b$, all operating together substantially as described, and for the purpose set forth.

2. In a lathe-chuck the indicator $a$, moving over graduation-marks on the face of the chuck, in combination with the jaw A, screw B, and indicator $b$, substantially as described.

3. In a lathe-chuck the combination of the indicator $b$, adjustable collar $c$, and screw B, substantially as described.

4. The locking mechanism $e\ d\ e'$ in combination with the screw B and jaw A, substantially as described.

DENNIS H. TIERNEY.

Witnesses:
JAMES SHEPARD,
WM. C. RICHARDS.